United States Patent

Schwartz et al.

[11] Patent Number: 5,275,552
[45] Date of Patent: Jan. 4, 1994

[54] LOW $NO_x$ GAS BURNER APPARATUS AND METHODS

[75] Inventors: Robert E. Schwartz, Tulsa; Samuel O. Napier, Sapulpa; Andrew P. Jones, Bixby, all of Okla.

[73] Assignee: John Zink Company, A Division of Koch Engineering Co. Inc., Tulsa, Okla.

[21] Appl. No.: 79,104

[22] Filed: Jun. 17, 1993

Related U.S. Application Data

[63] Continuation of Ser. No. 858,563, Mar. 27, 1992, Pat. No. 5,238,395.

[51] Int. Cl.⁵ ................................. F23N 3/04
[52] U.S. Cl. .............................. 431/10; 431/115; 431/159
[58] Field of Search ............... 431/10, 9, 8, 116, 115, 431/159

[56] References Cited

U.S. PATENT DOCUMENTS

| | | | |
|---|---|---|---|
| 4,277,942 | 7/1981 | Egnell et al. | 60/517 |
| 4,395,223 | 7/1983 | Okigami et al. | 431/10 |
| 4,505,666 | 3/1985 | Martin et al. | 431/175 |
| 4,575,332 | 3/1986 | Oppenberg et al. | 431/9 |
| 4,708,638 | 11/1987 | Brazier et al. | 431/116 |
| 5,044,932 | 9/1991 | Martin et al. | 431/116 |
| 5,073,105 | 12/1991 | Martin et al. | 431/116 |
| 5,098,282 | 3/1992 | Schwartz et al. | 431/9 |

FOREIGN PATENT DOCUMENTS

WO90/04740  5/1990  PCT Int'l Appl. .

Primary Examiner—Larry Jones
Attorney, Agent, or Firm—Dougherty, Hessin, Beavers & Gilbert

[57] ABSTRACT

Improved gas burner apparatus and methods of burning fuel gas-air mixtures are provided whereby flue gases having low $NO_x$ contents are formed. The burner apparatus includes a refractory burner tile having an air discharge opening therein and a wall surrounding the opening which extends into the furnace space and provides a mixing zone therein. At least one passage is formed in the burner tile which opens into the mixing zone and fuel gas is jetted through the passage whereby flue gases are drawn therethrough and a fuel gas-flue gases mixture is discharged into the mixing zone. The fuel gas-flue gases mixture is swirled in the mixing zone and mixes with air therein, and the resulting mixture is discharged and burned in a primary reaction zone in the furnace space.

25 Claims, 3 Drawing Sheets

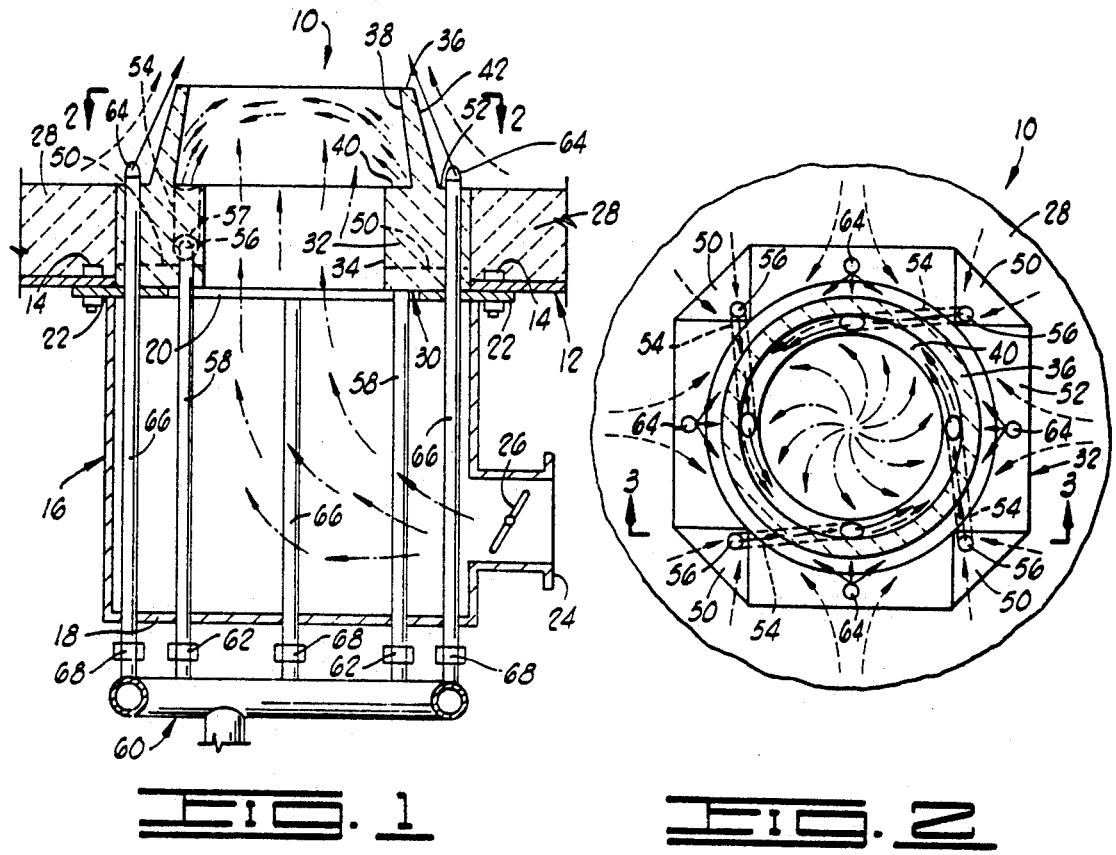
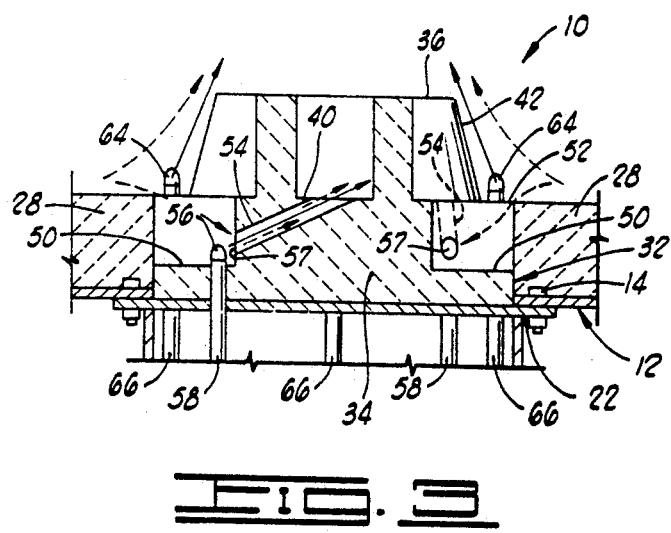

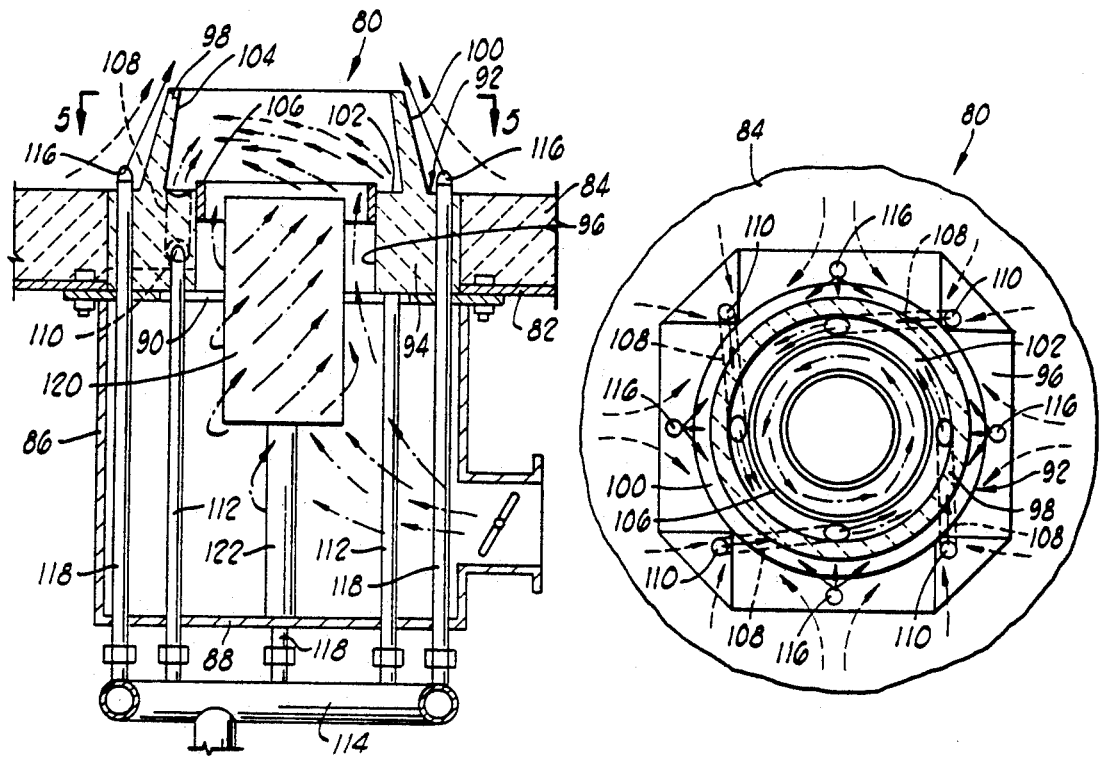
FIG. 4
FIG. 5
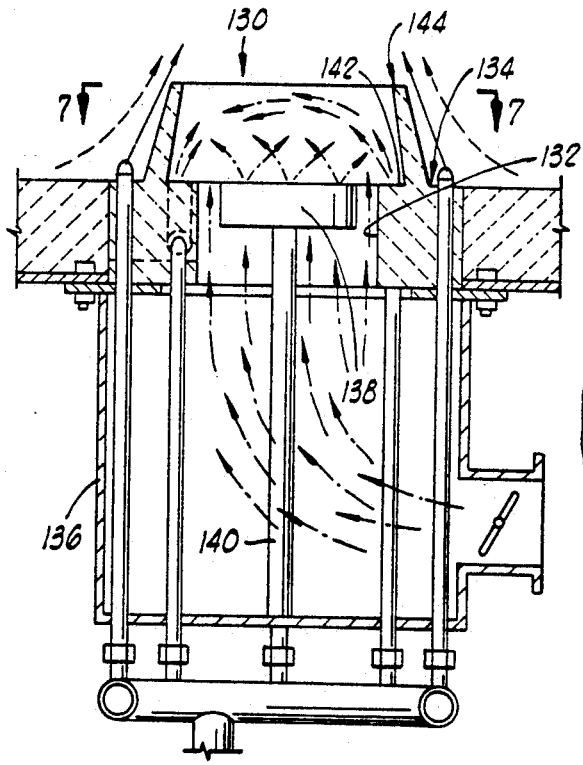
FIG. 6
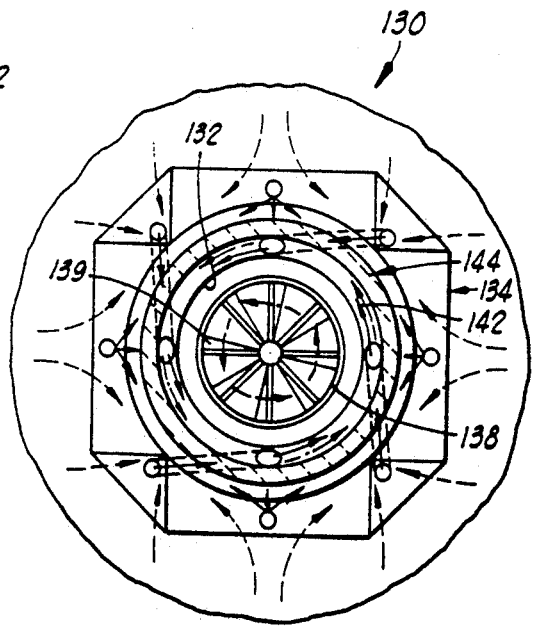
FIG. 7

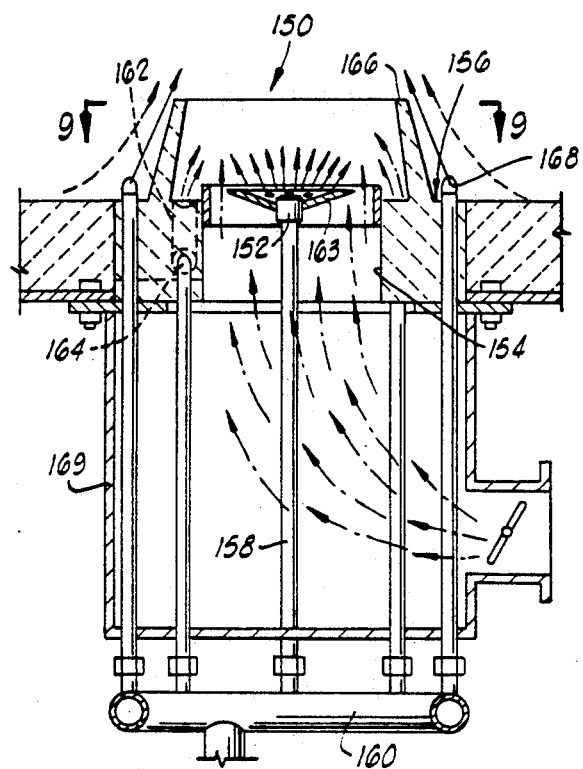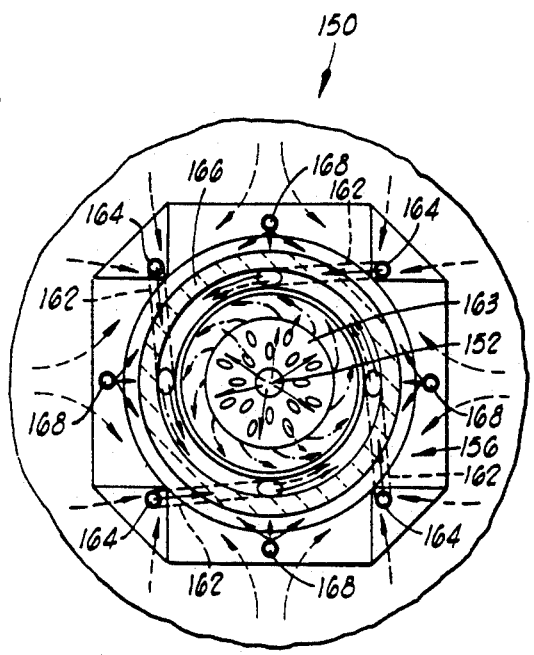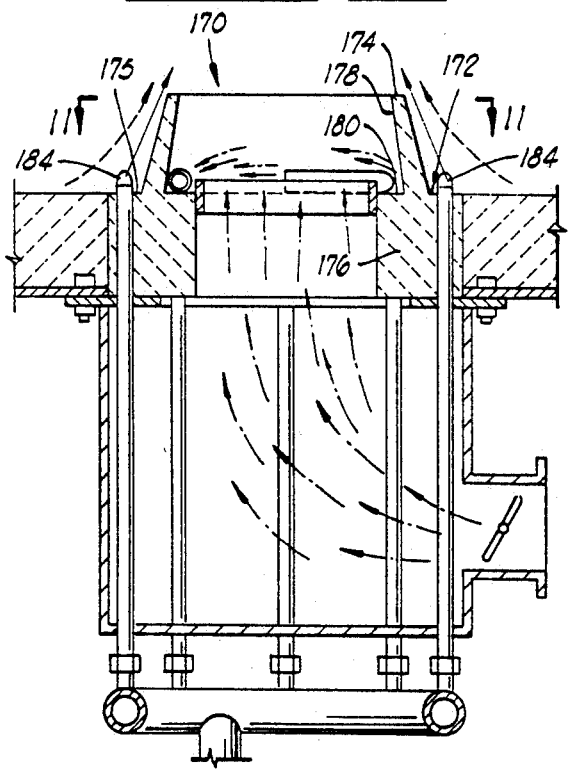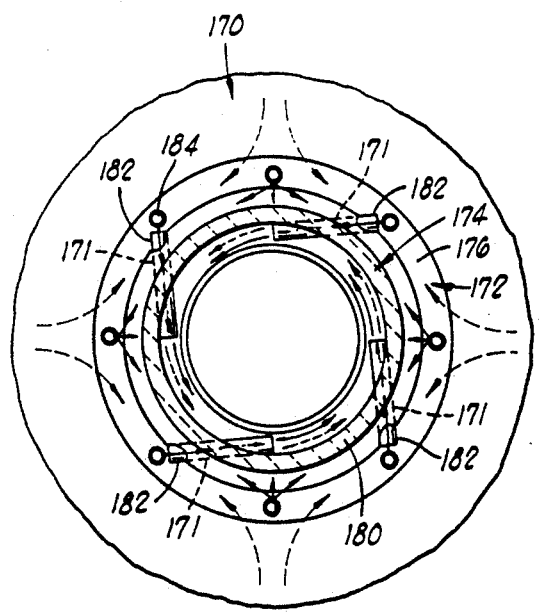

LOW NO$_x$ GAS BURNER APPARATUS AND METHODS

This is a continuation of copending application Ser. No. 07/858,563 filed on Mar. 27, 1992, now U.S. Pat. No. 5,238,395, issued on Aug. 24, 1993.

BACKGROUND OF THE INVENTION

1. Field of the Invention

The present invention relates to low NO$_x$ gas burner apparatus and methods for burning fuel gas-air mixtures whereby flue gases having low NO$_x$ content are produced.

2. Description of the Prior Art

More stringent environmental emission standards are continuously being imposed by governmental authorities which limit the quantities of gaseous pollutants such as oxides of nitrogen (NO$_x$) and carbon monoxide which can be emitted into the atmosphere. Such standards have led to the development of various improved gas burner designs which lower the production of NO$_x$ and other polluting gases. For example, methods and apparatus wherein fuel is burned in less than a stoichiometric concentration of oxygen to intentionally produce a reducing environment of CO and H$_2$ have been proposed. This concept has been utilized in staged air burner apparatus wherein the fuel is burned in a deficiency of air in a first zone producing a chemically reducing environment that suppresses NO$_x$ formation, and the remaining portion of air is introduced into a second oxidizing zone.

Methods and apparatus have also been developed wherein all of the air and some of the fuel is burned in a first zone and the remaining fuel is burned in a second zone. In this staged fuel approach, an excess of air in the first zone acts as a diluent which lowers the temperature of the burning gases and thereby reduces the formation of NO$_x$. Other methods and apparatus have been developed wherein flue gases are combined with fuel gas and/or fuel gas-air mixtures to dilute the mixtures and lower their combustion temperatures and the formation of NO$_x$.

While the prior art methods and burner apparatus for producing flue gases having low NO$_x$ content have achieved varying degrees of success, there still remains a need for improvement in gas burner apparatus and methods of burning fuel gas whereby simple economical burner apparatus is utilized and low NO$_x$ content flue gases are produced.

SUMMARY OF THE INVENTION

By the present invention, the above mentioned needs for improved gas burner apparatus and methods of burning fuel-air mixtures are met. That is, the present invention provides improved gas burner apparatus and methods for discharging mixtures of fuel and air into furnace spaces wherein the mixtures are burned and flue gases having low NO$_x$ content are formed therefrom.

An improved gas burner apparatus of this invention is basically comprised of a housing having an open end attached to a furnace space and means for introducing a controlled rate of air into the housing attached thereto. A refractory burner tile is attached to the open end of the housing having an opening formed therein for allowing air to pass from the housing into the furnace space. The burner tile also includes a wall surrounding the opening which extends into the furnace space and forms a mixing zone therewithin, the exterior sides of the wall being slanted towards the opening and the interior sides thereof being spaced from the periphery of the opening whereby a ledge is provided within the wall. At least one passage is formed in the burner tile for conducting primary fuel gas and flue gases from the exterior of the wall to the interior thereof. Means for forming a fuel gas jet in the passage and drawing flue gases thereinto are positioned with respect to the passage and to the burner tile whereby a mixture of primary fuel gas and flue gases from the furnace space is discharged from the passage into the mixing zone within the interior of the wall. At least one secondary fuel gas nozzle for discharging secondary fuel gas adjacent an external slanted side of the wall is positioned with respect to the wall and the burner tile whereby the secondary fuel gas mixes with flue gases in the furnace space prior to burning.

By the improved methods of the invention, a mixture of fuel gas and air is discharged into a furnace space wherein the mixture is burned and flue gases having low NO$_x$ content are formed therefrom. The methods basically comprise the steps of discharging substantially all of the air utilized into a mixing zone within the furnace space. A first portion of the fuel gas is mixed with flue gases from the furnace space to form a primary fuel gas-flue gases mixture. The primary fuel gas-flue gases mixture is discharged into the mixing zone from at least one location therein whereby the mixture is swirled around the periphery of the zone and mixes with the air discharged thereinto. The resulting primary fuel gas-flue gases-air mixture is discharged into a primary reaction zone in the furnace space wherein it is burned and flue gases having low NO$_x$ content are formed therefrom. The remaining portion of the fuel gas is discharged into the furnace space outside of the mixing zone whereby it mixes with flue gases and air remaining in the furnace space and is burned in a secondary reaction zone whereby additional flue gases having low NO$_x$ content are formed therefrom.

It is, therefore, a general object of the present invention to provide improved low NO$_x$ gas burner apparatus and methods.

A further object of the present invention is the provision of relatively simple and economical burner apparatus for carrying out the methods of the present invention whereby low NO$_x$ content flue gases are produced.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side cross-sectional view of one form of the burner apparatus of the present invention attached to a furnace wall.

FIG. 2 is a cross-sectional view taken along line 2—2 of FIG. 1.

FIG. 3 is a cross-sectional view taken along line 3—3 of FIG. 2.

FIG. 4 is a side cross-sectional view of an alternate form of burner apparatus of the present invention.

FIG. 5 is a cross-sectional view taken along line 5—5 of FIG. 4.

FIG. 6 is a side cross-sectional view of another form of the burner apparatus of this invention.

FIG. 7 is a cross-sectional view taken along line 7—7 of FIG. 6.

FIG. 8 is a side cross-sectional view of yet another form of burner apparatus of the present invention.

FIG. 9 is a cross-sectional view taken along line 9—9 of FIG. 8.

FIG. 10 is a side cross-sectional view of still another form of the burner apparatus of the present invention.

FIG. 11 is a cross-sectional view taken along line 11—11 of FIG. 10.

DESCRIPTION OF PREFERRED EMBODIMENTS

Referring now to the drawings, and particularly to FIGS. 1-3, a low $NO_x$ gas burner apparatus of the present invention is illustrated and generally designated by the numeral 10. The burner apparatus 10 is sealingly attached to the bottom wall 12 of a furnace space over an opening therein. While gas burner apparatus are commonly mounted vertically and fired upwardly as shown in the drawings, it is to be understood that the burners can also be mounted horizontally or they can be mounted vertically and fired downwardly.

The burner apparatus 10 is comprised of a housing 16 having a closed end 18 and an open end 20. The housing 16 is attached to the furnace wall 12 by means of a flange 22 attached thereto and a plurality of bolts 14 which extend through complimentary openings in the flange 22 and wall 12. A combustion air inlet connection 24 is attached to the housing 16, and a conventional air flow rate regulating damper 26 is connected to and disposed within the air inlet connection 24.

The furnace wall 12 includes an internal layer of insulating material 28 attached thereto, and the open end 20 of the housing 16 includes a burner tile 30 formed of flame and heat resistant refractory material attached thereto. In the embodiment illustrated in FIGS. 1-3, the interior surface of the insulating material 28 and the surface 52 of the base portion 32 of the burner tile 30 are located at corresponding positions and define a furnace space within which the fuel gas and air discharged by the burner apparatus 10 are burned as will be further described hereinbelow. However, it is to be understood that the surface 52 can also be positioned above or below the interior surface of the insulating material 28 if desired.

The burner tile 30 has a central opening 34 formed in the base portion 32 thereof through which air introduced into the housing 16 by way of the connection 24 is discharged. The burner tile 30 also includes a wall portion 36 which surrounds the opening 34 and extends into the furnace space. The interior sides 38 of the wall 36 are spaced from the periphery of the opening 34 whereby a ledge 40 is provided within the interior of the wall 36 and the exterior sides 42 of the wall 36 are slanted towards the opening 34. The interior sides 38 of the wall 36 are preferably also slanted towards the opening 34.

As best shown in FIGS. 2 and 3, the base portion 32 of the burner tile 30 includes four cut-out spaces therein which form triangular shaped surfaces 50 outside of the wall portion 36 at a level below the surface 52 thereof. Four passages 54 are formed in the base portion 32 which extend from the surfaces 50 in a counter-clockwise direction (FIG. 2) to the ledge 40. Each of the passages 54 is inclined and extends from outside the wall 36 at the level of a surface 50 to the ledge 40 within the interior of the wall 36.

A fuel gas jet forming nozzle 56 is positioned at each of the surfaces 50 adjacent an opening 57 into a passage 54 in the burner tile 30. The jet forming nozzles 56 are connected by conduits 58 to a fuel gas manifold 60. That is, the conduits 58 extend from the surfaces 50 through the burner tile 34, the interior of the housing 16 and the end wall 18 thereof to the manifold 60. The conduits 58 can be connected to the manifold 60 by unions 62 which can include orifices for proportioning the fuel gas between primary and secondary fuel gas as will be described further hereinbelow.

Positioned in spaced relationship on the surface 52 of the base portion 32 of the burner tile 30 outside of the wall 36 are four secondary fuel gas nozzles 64. The nozzles 64 are positioned adjacent the intersection of the exterior sides of the wall 36 with the surface 52 and include fuel gas discharge openings therein whereby secondary fuel gas is generally directed substantially parallel to and adjacent to the slanted exterior sides of the wall 36. The nozzles 64 are connected to fuel gas conduits 66. The conduits 66 which extend through the burner tile 30, the housing 16 and the end 18 thereof, are connected to the fuel gas manifold 60 by means of unions 68 which can also include orifices if necessary to proportion the fuel gas.

In operation of the burner apparatus 10, fuel gas is introduced into the furnace space to which the burner 10 is attached and burned therein at a flow rate which results in the desired heat release. A rate of air is introduced into the burner housing 16 by way of the connection 24 and flow regulating damper 26 such that a substantially stoichiometric or greater than stoichiometric mixture of fuel gas and air results in the furnace space. That is, a flow rate of air is introduced into the furnace space relative to the total flow rate of fuel gas introduced thereinto which results in a stoichiometric or greater than stoichiometric mixture. Preferably, the rate of air is in the range of from about the stoichiometric rate to about 25% greater than the stoichiometric rate.

As shown in the drawings by arrows formed of alternating dashes and dots, the air flows through the housing 16 and through the opening 34 in the burner tile 30 into the mixing zone formed within the interior of the wall portion 36. While within the mixing zone, the air mixes with the swirling primary fuel gas-flue gases mixture discharged into the zone by way of the passages 54, and the resulting primary fuel gas-flue gases-air mixture is discharged from the mixing zone formed by the wall 36 into a primary reaction zone in the furnace space wherein the mixture ignited in the mixing zone is burned and flue gases having low $NO_x$ content are formed therefrom. The remaining secondary portion of the fuel gas is discharged by way of the nozzles 64 adjacent to the slanted exterior sides of the wall 36 whereby the secondary fuel gas mixes with flue gases contained in the furnace space and is burned in a secondary reaction zone whereby additional flue gases having low $NO_x$ content are formed therefrom.

The portion of fuel gas which is used as primary fuel is generally in the range of from about 5% to about 75% by volume of the total fuel gas discharged by the burner apparatus 10 into the furnace space. That is, the flow rate of primary fuel gas discharged into the furnace space is from about 5% to about 75% of the total fuel gas flow rate conducted to the burner apparatus 10 and the flow rate of secondary fuel gas discharged is from about 95% to about 25% of the total fuel gas flow rate. The primary fuel gas is mixed with flue gases in an amount in the range of from about 1 volume to about 10 volumes of flue gases per volume of the primary fuel gas.

More specifically, primary fuel gas, preferably 15% by volume of the total fuel gas, flows from the manifold 60 by way of the conduits 58 to the primary fuel gas jet forming nozzles 56. The nozzles 56 form jets of primary fuel gas (shown by solid line arrows in the drawings) within the passages 54. The jets of primary fuel gas flowing through the passages 54 cause flue gases from the furnace space (shown by dashed line arrows in the drawings) to be drawn into the passages 54 whereby the flue gases are mixed with the primary fuel gas. The resulting primary fuel gas-flue gases mixtures are discharged from the passages 54 adjacent the ledge 40 against the interior sides 38 of the wall 36. Preferably, the passages 54 are positioned tangentially to the interior sides of the wall 36, and the primary fuel gas-flue gases mixtures discharged from the passages 54 are caused to swirl around the periphery of the mixing zone, i.e., above the ledge 40 and adjacent the interior sides 38 of the wall 36. As the primary fuel gas-flue gases mixtures swirl around the mixing zone, they mix with the air flowing through the zone and, as mentioned above, the resulting primary fuel gas-flue gases-air mixture begins to burn in the mixing zone and is discharged into a primary reaction zone in the furnace space wherein the mixture is burned.

The remaining portion of the fuel gas, i.e., the secondary fuel gas, is conducted from the manifold 60 by way of the conduits 66 to the nozzles 64. The secondary fuel gas is discharged by the nozzles 64 generally parallel to and adjacent the slanting exterior sides 42 of the wall 36 (as shown by the solid line arrows) whereby the secondary fuel gas mixes with flue gases from the furnace space (shown by dashed line arrows). The resulting secondary fuel gas-flue gases mixture is burned with oxygen remaining in the furnace space in a secondary reaction zone therein. The discharge openings in the nozzles 64 are preferably configured to spread the secondary fuel gas over the slanted exterior sides 42 of the wall 36 which enhances the mixing of the secondary fuel gas with flue gases from the furnace space.

Because both the primary fuel gas and secondary fuel gas are mixed with relatively cool flue gases prior to burning and the primary fuel gas-flue gases mixture also contains excess air, the burning of the mixtures is relatively cool and lower levels of $NO_x$ are produced in the flue gases.

Referring now to FIGS. 4 and 5, an alternate form of the burner apparatus of the present invention is illustrated and generally designated by the numeral 80. The burner apparatus 80 is in most respects the same as the burner apparatus 10 described above. That is, the burner apparatus 80 is connected to a wall 82 forming a furnace space and having a layer of insulating material 84 attached thereto. The burner apparatus 80 is comprised of a housing 86 having a closed end 88 and an open end 90 which is attached to the wall 82. A burner tile 92 is attached to the open end 90 of the housing 86 having a portion 94 corresponding in thickness to the insulating material 84, a central cylindrical opening 96 formed therein and a wall portion 98 which extends into the furnace space and forms a mixing zone therewithin. The exterior sides 100 of the wall 98 are slanted towards the opening 96, and a ledge 102 is formed interiorally of the wall 98. The interior sides of the wall 98 are preferably also slanted towards the opening 96, and a deflector ring 106 is connected within the opening 96. The deflector ring 106 is optional and can be included in the burner apparatus 80 (and also in the above described burner apparatus 10) to help maintain the fuel gas-flue gases mixtures discharged within the wall 98 above the ledge 102 as the mixtures swirl and mix. When included, the deflector ring is positioned at the interior edge of the ledge 102.

Four passages 108 are formed in the burner tile 92 which are identical to the passages 54 of the burner apparatus 10 described above, and primary fuel gas jet forming nozzles 110 are provided for jetting primary fuel gas through the passages 108 and drawing flue gases therein. The jet forming nozzles 110 are connected by conduits 112 to a fuel gas manifold 114. Four additional nozzles 116 are provided for discharging secondary fuel gas generally parallel to and adjacent to the sloped exterior sides 100 of the wall 98. The nozzles 116 are connected to conduits 118 which are in turn connected to the fuel gas manifold 114.

The burner apparatus 80 is different from the previously described burner apparatus 10 only in that it includes means for annularizing the flow of air through the opening 96 in the burner tile 94. That is, a cylindrical baffle 120 is positioned centrally within the opening 96. The cylindrical baffle 120 is supported within the opening 96 and within the housing 86 by a support member 122 attached to the baffle 120 and to the end wall 88 of the housing 86.

The operation of the burner apparatus 80 is identical in all respects to the operation of the burner apparatus 10 described above except that the cylindrical baffle 120 causes the air flowing through the opening 96 and into the mixing zone within the wall 98 to be annularized, i.e., forced to the periphery of the opening. This annularization of the air flow through the mixing zone facilitates and increases the mixing of the primary fuel gas-flue gases mixtures with the air prior to being discharged into the primary reaction zone. Further, as indicated by the arrows formed of alternating dashes and dots, the flow of air can be caused to swirl as it flows through the opening 96 by introducing the air into the housing 86 tangentially to the baffle 120.

Referring now to FIGS. 6 and 7, another alternate form of burner apparatus of the present invention is illustrated and generally designated by the numeral 130. The burner apparatus 130 is identical to the apparatus 10 described above and its operation is the same except that means are provided within the housing 136 for swirling the air as it passes through the opening 132 in the burner tile 134. While the means for swirling the air can vary in size and design, in the burner apparatus 130 a fixed blade swirler 138 is positioned and held within the opening 132 by a support member 140 attached to the housing 136. The fixed blade swirler 138 includes a plurality of fixed blades 139 (FIG. 7) positioned around a central axis, the blades having a pitch such that at least a part of the air flowing through the opening 132 is caused to swirl as shown by the arrows formed of alternating dots and dashes.

The operation of the burner apparatus 130 is identical to the operation of the burner apparatus 10 described above except that the swirling of the air increases and enhances the mixing of the air with the fuel gas-flue gases mixtures discharged within the mixing zone defined by the wall 144.

Referring now to FIGS. 8 and 9, yet another alternate form of the burner apparatus of the present invention is illustrated and generally designated by the numeral 150. The burner apparatus 150 is identical to the burner apparatus 10 in structure and operation with the exception that an interior fuel gas nozzle 152 is positioned within the opening 154 in the burner tile 156. The nozzle 152 is connected by a conduit 158 to the fuel gas manifold 160. In a preferred embodiment, the burner apparatus 150 also includes a conventional flame holder 162 positioned adjacent to and around the nozzle 152.

In operation of the burner apparatus 150, a portion of the fuel gas is discharged into the mixing zone defined by the wall 166 of the burner tile 156 from a location within the opening 154 by the interior fuel gas nozzle 152. While the particular portion of the fuel gas discharged into the mixing zone by way of the interior nozzle 152 can vary, it preferably is a portion in the range of from about 15% to about 30% by volume of the primary fuel gas. That is, the primary fuel gas portion is in the range of from about 5% to about 75% by volume of the total fuel gas conducted to the burner apparatus 150, most preferably about 15%, and the portion of the fuel gas discharged by the interior nozzle 152 is preferably in the range of from about 15% to about 30% by volume of the primary fuel gas, most preferably about 20%. The discharge of a portion of the fuel gas from a location within the opening 154 facilitates and increases the mixing of the primary fuel gas with air in the mixing zone.

Referring now to FIGS. 10 and 11, still another form of the burner apparatus of the present invention is illustrated and designated by the numeral 170 The burner apparatus 170 is identical in structure and operation to the burner apparatus 10 previously described except that the passages 171 in the burner tile 172 are formed horizontally from the exterior of the wall 174 to the interior thereof at the level of the surface 175 of the base portion 176 of the burner tile 172. The passages 171 are formed tangentially to the interior sides 178 of the wall 174 immediately above the ledge 180 therein. In a preferred embodiment, tubes 182 formed of high temperature and corrosion resistant metal or similar material are disposed within the passages 171 so that the primary fuel jetted into the tubes 182 by the nozzles 184 travel further and are mixed with greater quantities of flue gases.

In order to further illustrate the burner apparatus and methods of this invention, the following examples are given.

EXAMPLE I

A burner apparatus 10 designed for a heat release of 10,000,000 BTU/hour by burning natural gas having a caloric value of 1,000 BTU/SCF is fired into a furnace space.

Pressurized fuel gas is supplied to the manifold 60 of the burner 10 at a pressure of about 30 PSIG and at a rate of 10,000 SCF/hour. A 15% by volume portion of the fuel gas (1500 SCF/hour) is used as primary fuel gas and is jetted into the passages 54 by the nozzles 56 and about 7500 SCF/hour of flue gases are drawn into the passages 54 and mixed with the primary fuel gas (about 5 volumes of flue gases per volume of primary fuel gas). The remaining secondary portion of the fuel gas, i.e., 8500 SCF/hour, is discharged into the furnace space by the nozzles 64.

The rate of air introduced into the housing 16 is controlled by means of the damper 26 such that the rate of air introduced into the furnace space 21 is at least a substantially stoichiometric rate relative to the total fuel gas rate discharged therein.

The air flows through the opening 34 of the burner tile 30 into the mixing zone defined by the wall portion 36 of the burner tile 30 and mixes with the primary fuel gas-flue gases mixtures discharged therein by way of the passages 54. The resulting primary fuel gas-flue gases-air mixture begins to burn and is discharged into and burned in a primary reaction zone in the furnace space.

The fuel discharged from the secondary fuel nozzles 64 mixes with flue gases from the furnace space and air remaining from the primary reaction zone and is burned in a secondary reaction zone generally adjacent to and surrounding the primary reaction zone in the furnace space.

Because of the dilution of the primary and secondary fuel gas with flue gases, relatively low temperature burning results whereby the flue gases formed have a low $NO_x$ content. That is, the flue gases withdrawn from the furnace space have a $NO_x$ content of less than about 25 ppm.

EXAMPLE II

A burner apparatus 150 designed for a heat release of 10,000,000 BTU/hour by burning natural gas having a caloric value of 1,000 BTU/SCF is fired into a furnace space.

Pressurized fuel-gas is supplied to the burner 150 at a pressure of about 30 PSIG and at a rate of 10,000 SCF/hour. A 15% by volume portion of the fuel gas (1500 SCF/hour) is utilized as the primary fuel gas which is jetted into the passages 162 by the nozzles 164 and about 7500 SCF/hour of flue gases are drawn into the passages 162 and mixed with the fuel gas (about 5 volumes of flue gases per volume of primary fuel gas). A 5% by volume portion of the fuel gas (500 SCF/hour) is also utilized as interior fuel gas and is discharged into the mixing zone formed by the wall portion 166 of the burner tile 156 by the interior nozzle 152. The remaining secondary portion of the fuel gas, i.e., 8000 SCF/hour is discharged into the furnace space by the secondary nozzles 168.

The rate of air introduced into the housing 169 is controlled such that the rate of air discharged into the furnace space is at least a substantially stoichiometric rate relative to the total fuel gas rate discharged therein.

The air flows through the opening 154 of the burner tile 156 into the mixing zone defined by the wall portion 166 of the burner tile 156 and mixes with the primary fuel gas-flue gases mixtures discharged therein by way of the passages 162 and with the interior fuel discharged by the nozzle 152. The resulting fuel gas-flue gases-air mixture begins to burn and is discharged into and burned in a primary reaction zone in the furnace space.

The fuel gas discharged from the secondary fuel gas nozzles 168 mixes with flue gases from the furnace space and air remaining from the primary reaction zone and is burned in a secondary reaction zone generally adjacent to and surrounding the primary reaction zone in the furnace space.

Because of the dilution of the primary and secondary fuel gas with flue gases, relatively low temperature burning results whereby the flue gases formed and withdrawn from the furnace space have a $NO_x$ content of less than about 25 ppm.

Thus, the present invention is well adapted to carry out the objects and attain the ends and advantages mentioned as well as those which are inherent therein. Numerous changes in the construction and arrangement of parts of the burner apparatus of the present invention may be made by those skilled in the art. For example, more or less than four primary and four secondary fuel gas nozzles and related apparatus can be utilized, and the housing, burner tile and wall portion of the burner tile can take various shapes and forms other than those described herein. Such changes are encompassed within the spirit of this invention as defined by the appended claims.

What is claimed is:

1. An improved gas burner apparatus for discharging a mixture of fuel gas and air into a furnace space wherein said mixture is burned and flue gases having low $NO_x$ content are formed therefrom comprising:

a housing having an open end attached to said furnace space;

means for introducing a controlled flow rate of said air into said housing attached thereto;

a refractory burner tile attached to the open end of said housing having an opening formed therein for allowing air to pass therethrough and having a wall surrounding said opening which extends into said furnace space, the exterior sides of said wall being slanted towards said opening and the interior sides thereof being spaced from the periphery of said opening whereby a ledge is provided within the interior of said wall;

at least one passage in said burner tile for conducting primary fuel gas and flue gases from the exterior of said wall to the interior thereof;

means for forming a fuel gas jet in said passage and drawing flue gases therethrough adapted to be connected to a source of fuel gas and positioned with respect to said passage whereby primary fuel gas and flue gases from said furnace space are discharged from said passage to within the interior of said wall; and at least one nozzle adapted to be connected to a source of fuel gas positioned outside said wall of said burner tile for discharging secondary fuel gas adjacent an external slanted side of said wall whereby said secondary fuel gas mixes with flue gases and air in said furnace space.

2. The burner apparatus of claim 1 wherein said passage in said burner tile is positioned to discharge said primary fuel gas and flue gases against the interior sides of said wall.

3. The burner apparatus of claim 1 wherein said nozzle for discharging secondary fuel gas is positioned adjacent the intersection of said external slanted side of said wall with the surface of the burner tile outside of said wall.

4. The burner apparatus of claim 1 wherein said interior sides of said wall are slanted towards said opening.

5. The burner apparatus of claim 1 wherein said burner tile includes a plurality of said passages formed therein and means for forming fuel gas jets in each of said passages.

6. The burner apparatus of claim 5 wherein a plurality of said nozzles for discharging secondary fuel gas are positioned adjacent the external sides of said wall.

7. The burner apparatus of claim 5 wherein said opening, said wall and said ledge are substantially circular and said passages are positioned in said burner tile to discharge fuel gas and flue gases tangentially to the interior sides of said wall.

8. The burner apparatus of claim 5 wherein said passages are inclined.

9. The burner apparatus of claim 1 which further comprises means for annularizing the flow of air through said opening in said burner tile attached to said housing.

10. The burner apparatus of claim 9 wherein said means for annularizing said air flow comprises a cylindrical baffle positioned in said opening.

11. The burner apparatus of claim 1 which further comprises means for swirling all or part of the flow of air through said opening in said burner tile attached to said housing.

12. The burner apparatus of claim 11 wherein said means for swirling said air flow comprises a plurality of stationary blades positioned in said opening, each of said blades having a pitch such that said air flow is caused to swirl.

13. A method of discharging a mixture of fuel gas and air into a furnace wherein said mixture is burned and flue gases having low $NO_x$ content are formed therefrom comprising the steps of:

(a) discharging said air into a mixing zone surrounded by a wall which extents into said furnace space and has exterior slanted sides;

(b) mixing a portion of said fuel gas with flue gases from said furnace space to form a primary fuel gas-flue gases mixture;

(c) discharging said primary fuel gas-flue gases mixture into said mixing zone from at least one location therein whereby said mixture is swirled around the periphery of said zone and mixes with air in said zone and the resulting primary fuel gas-flue gases-air mixture is discharged into a primary reaction zone in said furnace space wherein it is burned; and (c) discharging the remaining said mixture of fuel gas into said furnace space from at least one location outside of said wall adjacent to an exterior slanted side thereof.

14. The method of claim 13 wherein said mixture of fuel gas and air discharged into said furnace space is at least a substantially stoichiometric mixture.

15. The method of claim 13 wherein said portion of said fuel gas used to form said primary fuel gas-flue gas mixture in accordance with step (b) is in the range of from about 5% to about 75% by volume of the total fuel gas discharged into said furnace space.

16. The method of claim 13 wherein said primary fuel gas-flue gases mixture formed in accordance with step (b) contains flue gases in an amount in the range of from about 1 volume to about 10 volumes per volume of said fuel in said mixture.

17. The method of claim 13 wherein said air is discharged into said mixing zone in accordance with step (a) by way of an opening in a burner tile connected to said furnace space.

18. The method of claim 17 wherein said wall is connected to said burner tile and surrounds said opening therein, the interior sides of said wall being spaced from the periphery of said opening whereby a ledge is provided within the interior of said wall.

19. The method of claim 18 wherein said primary fuel gas-flue gases mixture of step (b) is formed by jetting said fuel gas through at least one passage in said burner tile extending from outside said wall to the interior thereof whereby flue gases are drawn into said passage and mixed with said fuel gas.

20. The method of claim 19 wherein the interior sides of said wall are slanted towards said opening and said primary fuel gas-flue gases mixture is discharged in accordance with step (c) from said passage in said burner tile against the interior sides of said wall adjacent to said ledge.

21. The method of claim 20 wherein said opening, said wall and said ledge are substantially circular and said fuel gas-glue gases mixture is discharged tangentially to the interior sides of said wall.

22. The method of claim 13 wherein said primary fuel gas-flue gases mixture is discharged in accordance with step (c) from a plurality of locations in said mixing zone.

23. The method of claim 13 wherein said remaining portion of said fuel gas is discharged in accordance with step (D) from a plurality of locations outside of said mixing zone.

24. The method of claim 13 which further comprises the step of swirling said air prior to discharging it into said mixing zone.

25. The method of claim 13 which further comprises annularizing said air prior to discharging it into said mixing zone.

* * * * *

UNITED STATES PATENT AND TRADEMARK OFFICE
CERTIFICATE OF CORRECTION

PATENT NO. : 5,275,552
DATED : January 4, 1994
INVENTOR(S) : Robert E. Schwartz et al It is certified that error appears in the above-indentified patent and that said Letters Patent is hereby corrected as shown below:

Column 9, line 29, after "passage" and before "in" insert --formed--.
Column 10, line 36, delete "(c)" and substitute --(d)--.
Column 10, line 36, after "remaining" and before "said" insert --portion of--.
Column 10, line 36, delete "mixture of"
Column 11, line 12, delete the word "gas-glue" and substitute --gas-flue- Signed and Sealed this Thirty-first Day of May, 1994

Attest:

BRUCE LEHMAN

*Attesting Officer*    *Commissioner of Patents and Trademarks*